United States Patent
Tsunoda

(10) Patent No.: US 6,962,196 B2
(45) Date of Patent: Nov. 8, 2005

(54) MODE SWITCHING CONTROL DEVICE OF VEHICLE AIR-CONDITIONING APPARATUS

(75) Inventor: Isao Tsunoda, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 0 days.

(21) Appl. No.: 10/439,029

(22) Filed: May 14, 2003

(65) Prior Publication Data
US 2003/0226658 A1    Dec. 11, 2003

(30) Foreign Application Priority Data
Jun. 6, 2002   (JP) .............................. 2002-165637

(51) Int. Cl.[7] .......................... F25B 29/00; B60H 1/00; B60H 3/00
(52) U.S. Cl. .......................... 165/204; 165/42; 165/43; 165/203; 236/91 C; 236/49.3
(58) Field of Search .............................. 236/91 C, 49.3; 165/203, 42, 43, 204

(56) References Cited

U.S. PATENT DOCUMENTS

| | | | |
|---|---|---|---|
| 4,417,618 A | | 11/1983 | Yoshimi et al. |
| 5,181,654 A | * | 1/1993 | Yoshimi et al. ............ 236/91 C |
| 5,199,485 A | * | 4/1993 | Ito et al. ..................... 165/203 |
| 5,337,802 A | * | 8/1994 | Kajino et al. ............... 165/203 |
| 5,553,661 A | * | 9/1996 | Beyerlein et al. ........... 165/203 |
| 6,575,378 B2 | * | 6/2003 | Aoki et al. ................. 236/49.3 |
| 6,622,928 B2 | * | 9/2003 | Tsunoda et al. ........... 236/91 C |

* cited by examiner

Primary Examiner—John K. Ford
(74) Attorney, Agent, or Firm—Hamre, Schumann, Mueller & Larson, P.C.

(57) ABSTRACT

A mode switching control device of a vehicle air-conditioning apparatus capable of selecting vent mode delivery, whereby air is delivered to an upper part of the inside of a passenger compartment; foot mode delivery, whereby air is delivered to a lower part of the passenger compartment; and bi-level mode delivery, whereby the vent mode delivery and the foot mode delivery are implemented together. Even when on the basis of a target outlet temperature foot mode delivery has been selected, when the occupant insolation level is above a predetermined level the control device switches to the bi-level mode to provide the occupant with a comfortable air-conditioning feeling even when the vehicle is running.

3 Claims, 10 Drawing Sheets

POSITION OF SUN WITH RESPECT TO VEHICLE

MODE SWITCHING CONTROL DEVICE OF VEHICLE AIR-CONDITIONING APPARATUS

FIELD OF THE INVENTION

The present invention relates to a vehicle air-conditioning apparatus and, more particularly to a mode switching control device of a vehicle air-conditioning apparatus.

BACKGROUND OF THE INVENTION

There have been vehicle air-conditioning apparatus in which even when on the basis of a target outlet temperature foot mode delivery has been selected, if the amount of solar radiation detected by a solar radiation level sensor exceeds a predetermined level, a switch is made to bi-level mode delivery.

For example, in JP-B-60-21887, an air-conditioning apparatus is disclosed which has switching means for switching in accordance with thermal load conditions expressed with a target outlet temperature between vent mode delivery, whereby air is delivered to the upper part of a passenger compartment; foot mode delivery, whereby air is delivered to a lower part of the passenger compartment; and bi-level mode delivery, whereby vent mode delivery and foot mode delivery are implemented at the same time, and a solar radiation level sensor. Also disclosed is technology whereby even when foot mode delivery has been selected by this switching means, if strong solar radiation is entering the passenger compartment, on the basis of a detection signal of a solar radiation level sensor for sensing hotness caused by solar radiation, bi-level mode delivery is selected, and a cool draft is delivered from an upper side of the outlet to an upper part of the inside of a passenger compartment to eliminate the hotness caused by the solar radiation.

However, depending on the positional relationship between the vehicle body and the sun, the body of an occupant exposed to solar radiation entering the passenger compartment may be partly in the shade of the roof and pillars of the vehicle body. And, because the solar radiation level sensor is normally disposed near the middle of the front of the top face of an instrument panel, the solar radiation level detected by the solar radiation level sensor does not always reflect the level of solar radiation to which the occupant is actually exposed.

FIG. 10A and FIG. 10B are views showing differences in the solar radiation received by an occupant and the solar radiation received by a solar radiation level sensor resulting from the positional relationship between the vehicle body and the sun. FIG. 10A shows the sun positioned in front of the vehicle, and FIG. 10B shows the sun positioned slightly behind directly above the vehicle.

As shown in FIG. 10A, when the sun 100 is positioned in front of a vehicle body 101, rays from the sun reach both a solar radiation level sensor 103 and the upper body of an occupant 104 at the same time, through a front windshield 102.

On the other hand, as shown in FIG. 10B, when the sun 100 is slightly behind directly above the vehicle body 101, whereas rays from the sun 100 reach the solar radiation level sensor 103 through the front windshield 102, rays from the sun 100 approaching the occupant 104 are blocked by a roof 105 and do not reach the occupant 104.

Thus, depending on the positional relationship between the vehicle body 101 and the sun 100, cases arise where notwithstanding that the sun's rays are reaching the solar radiation level sensor 103 in the same way, the amount of sunlight (solar radiation) reaching the occupant 104 differs.

Consequently, it sometimes happens that even though an occupant is in the shade of the vehicle body (the roof or a pillar) and is not feeling hotness, if the solar radiation level sensor detects a predetermined level of solar radiation (intensity of the sun's rays), the outlet is switched to bi-level and a cool draft is delivered. In this case, because the occupant is exposed to a cool draft despite not being exposed to solar radiation, the occupant feels cold. In this way, depending on the position of the sun and the positional relationship of the vehicle body and the occupant, there has been the problem that a mismatch arises between the switching of outlets and the feeling of the occupant.

Consequently, a way has been awaited of switching to a mode matched to the feeling of the occupant with respect to the sun.

SUMMARY OF THE INVENTION

This invention provides a mode switching control device of a vehicle air-conditioning apparatus capable of selecting vent mode delivery, whereby air is delivered to an upper part of the inside of a passenger compartment; foot mode delivery, whereby air is delivered to a lower part of the inside of the passenger compartment; and bi-level mode delivery, whereby the vent mode delivery and the foot mode delivery are implemented together, which control device, even when on the basis of a target outlet temperature the foot mode delivery has been selected, when an occupant insolation level expressing the amount of heat being received by the body of an occupant in the form of radiation from the sun is above a predetermined value, performs control to effect the bi-level mode delivery.

In this way, with a mode switching control device according to the invention, even when foot mode delivery has been selected on the basis of a target outlet temperature, when an occupant insolation level is above a predetermined level, a mode change is made to bi-level mode delivery, and consequently an environment matched to the feeling of the occupant with respect to the sun is obtained inside the passenger compartment.

In this invention, the occupant insolation level may preferably be obtained for example by multiplying a solar radiation level obtained from a solar radiation level sensor by an occupant insolation ratio obtained from a projection area as seen in the solar radiation direction of a part of the body of an occupant receiving solar radiation in correspondence with the position of the sun with respect to the vehicle, or may be obtained by multiplying a solar radiation level obtained from a solar radiation level sensor by an occupant insolation ratio obtained from a solar radiation level of a part of the body of an occupant receiving solar radiation in correspondence with the position of the sun with respect to the vehicle. Thus, a level of solar radiation received from the sun by an occupant can be obtained accurately while utilizing a solar radiation level sensor provided in the air-conditioning apparatus.

The predetermined value in this invention is preferably made to change in correspondence with the target outlet temperature. In this way, optimal mode switching corresponding to the size of the target outlet temperature can be carried out.

BRIEF DESCRIPTION OF THE DRAWINGS

A preferred embodiment of the invention will now be described in detail with reference to the accompanying drawings, in which.

DETAILED DESCRIPTION OF THE PREFERRED EMBODIMENTS

Figure 1:
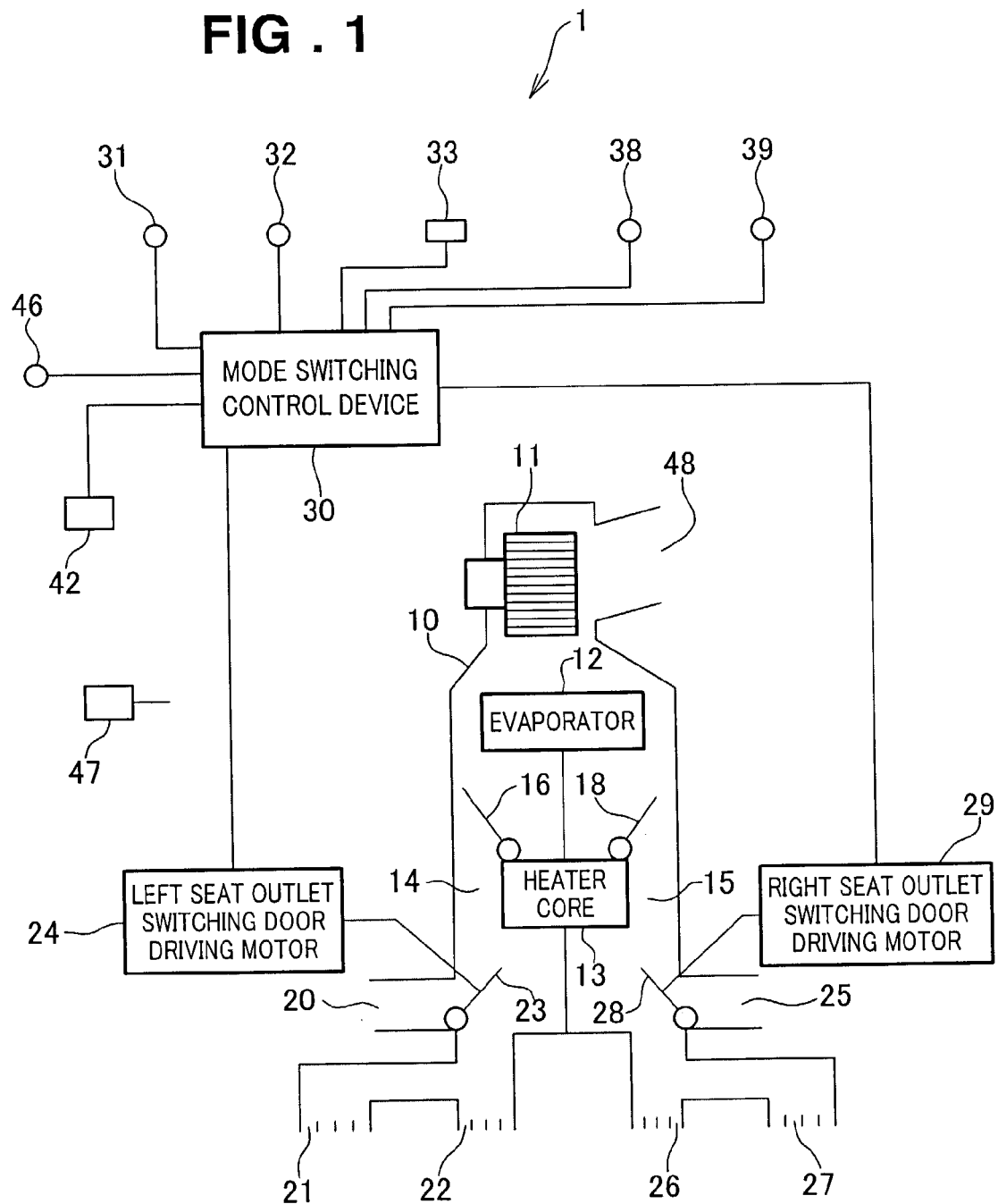
FIG. 1 is an outline construction view of a vehicle air-conditioning apparatus according to the invention.

A vehicle air-conditioning apparatus 1 according to the invention shown in FIG. 1 is made up of a ventilation duct 10, an electric blower (blower motor) 11, an evaporator (cooling heat exchanger) 12, a heater core (heating heat exchanger) 13, bypass ducts 14, 15, a left seat temperature adjusting door 16, a right seat temperature adjusting door 18, a left seat foot outlet 20, left seat vent outlets 21, 22, a left seat outlet switching door 23, a left seat outlet switching door driving motor 24, a right seat foot outlet 25, right seat vent outlets 26, 27, a right seat outlet switching door 28, and a right seat outlet switching door driving motor 29. The vehicle air-conditioning apparatus 1 also has a mode switching control device 30, an inside air temperature sensor 31, an outside air temperature sensor 32, a temperature setter 33, a solar radiation level sensor 38, a solar radiation direction detecting device 39, and a switch panel 42. The reference numeral 46 denotes an ignition switch, and 47 a vehicle battery.

The ventilation duct 10 is disposed at the front of the passenger compartment of the vehicle and has an intake opening 48 formed in its upstream end. The intake opening 48 has an outside air inlet for introducing outside air and an inside air inlet for recirculating inside air (not shown).

At the downstream end of the ventilation duct 10 are formed the left seat vent outlets 21, 22, which are for delivering air temperature-adjusted in the ventilation duct 10 into a left upper part of the passenger compartment; the left seat foot outlet 20, which is for delivering the same air into a left lower part of the passenger compartment; the right seat vent outlets 26, 27, which are for delivering air temperature-adjusted in the ventilation duct 10 into a right upper part of the passenger compartment; and the right seat foot outlet 25, which is for delivering the same air into a right lower part of the passenger compartment. Also, near the intake opening 48 at the upstream end, an inside/outside air door (not shown) for opening and closing the inside and outside air inlets is provided.

The electric blower 11 draws air in through the outside air inlet or the inside air inlet of the intake opening 48 and blows it toward the evaporator 12. The evaporator 12 removes heat from air blown through it by the electric blower 11 and thereby cools this air. Air having passed through this evaporator 12 leaves as cool air. The heater core 13 imparts heat to air flowing through it from the electric blower 11 and thereby heats this air. Air having passed through this heater core 13 leaves as warm air. The bypass ducts 14, 15 are passages for allowing cool air having passed through the evaporator 12 to bypass the heater core 13.

The left seat temperature adjusting door 16 is a device for adjusting the ratio of air passing through the heater core 13 to air passing through the bypass duct 14. The right seat temperature adjusting door 18 is a device for adjusting the ratio of air passing through the heater core 13 to air passing through the bypass duct 15.

The left seat foot outlet 20 is an air outlet positioned below a left seat. The right seat foot outlet 25 is an air outlet positioned below a right seat. The left seat vent outlets 21, 22 are outlets for delivering air to above the left seat. The right seat vent outlets 26, 27 are outlets for delivering air to above the right seat.

The left seat outlet switching door 23 opens and closes the left seat foot outlet 20 and the left seat vent outlets 21, 22. The right seat outlet switching door 28 opens and closes the right seat foot outlet 25 and the right seat vent outlets 26, 27.

The left seat outlet switching door driving motor 24 is a motor for driving the left seat outlet switching door 23. This left seat outlet switching door driving motor 24 is controlled by the mode switching control device 30. The mode switching control device 30 adjusts the aperture of the left seat outlet switching door 23 by way of the left seat outlet switching door driving motor 24. By this means, adjustment of a foot mode delivery, a vent mode delivery and a bi-level mode delivery for the left seat is carried out. That is, when the left seat vent outlets 21, 22 are closed by the left seat outlet switching door 23, air flows out from the left seat foot outlet 20 and a foot mode delivery is thereby effected. And when the left seat foot outlet 20 is closed by the left seat outlet switching door 23, a vent mode delivery is effected. And when the left seat outlet switching door 23 is in an intermediate position, a bi-level mode delivery is effected.

The right seat outlet switching door driving motor 29 is a motor for driving the right seat outlet switching door 28. This right seat outlet switching door driving motor 29 is controlled by the mode switching control device 30. The mode switching control device 30 adjusts the aperture of the right seat outlet switching door 28 by way of the right seat outlet switching door driving motor 29. By this means, adjustment of a foot mode delivery, a vent mode delivery and a bi-level mode delivery for the right seat is carried out. That is, when the right seat vent outlets 26, 27 are closed by the right seat outlet switching door 28, air flows out through the right seat foot outlet 25 and a foot mode delivery is effected. When the right seat foot outlet 25 is closed by the right seat outlet switching door 28, a vent mode delivery is effected. And when the right seat outlet switching door 28 is in an intermediate position, a bi-level mode delivery is effected.

The inside air temperature sensor 31 is a sensor for detecting the temperature inside the passenger compartment, and produces a signal Tr corresponding to the temperature inside the passenger compartment. The outside air temperature sensor 32 is a sensor for detecting the temperature outside the passenger compartment, and produces a signal Ta corresponding to the temperature outside the passenger compartment. The temperature setter 33 is a device for producing a signal Ts corresponding to a set temperature. This temperature setter 33 can be used to set a set temperature for each of the left and right seats.

The solar radiation level sensor 38 is a sensor for producing a signal Tsun corresponding to the amount of solar radiation entering the passenger compartment, and consists of a photo transistor or the like. The solar radiation direction detecting device 39 is a device for detecting the solar radiation direction, i.e. the position of the sun with respect to the vehicle expressed with a bearing angle and an elevation angle, and for example may be a device which obtains the position of the sun with respect to the vehicle on the basis of a latitude and a longitude indicating the position of the vehicle, and the present time and the orientation of the vehicle, from a car navigation system, or may be a device which obtains the position of the sun with respect to the vehicle on the basis of differences in the incidence of solar radiation on the elements of a solar radiation level sensor having multiple solar radiation level detecting elements.

The switch panel 42 produces ON and OFF signals on the basis of operation of a group of switches including an ON switch, an OFF switch and an operating mode selection switch.

The mode switching control device 30 receives and processes information signals from the inside air temperature sensor 31, the outside air temperature sensor 32, the temperature setter 33, the solar radiation level sensor 38 and the solar radiation direction detecting sensor 39, and electrically orders operation of the left seat outlet switching door driving motor 24 and the right seat outlet switching door driving motor 29. The mode switching control device 30 receives a supply of power from the vehicle battery 47 and so becomes operational when the ignition switch 46 of the vehicle is turned on.

Figure 2:
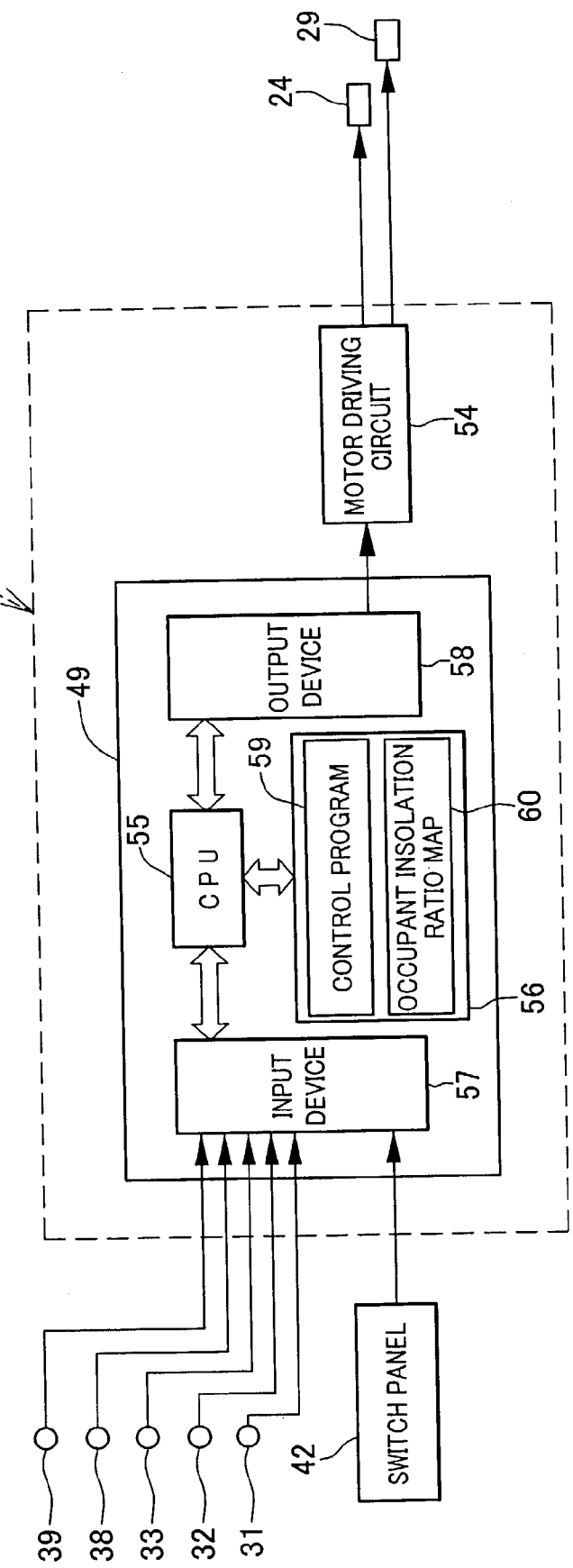
FIG. 2 is an electrical function block diagram of a mode switching control device shown in FIG. 1.

As shown in FIG. 2, the mode switching control device 30 has a digital computer 49.

The digital computer 49 is made up of a CPU 55, a memory 56, an input part 57 and an output part 58, and executes information processing on the basis of a pre-set control program. A control program 59 and an occupant insolation ratio map 60 are stored in the memory 56.

Here, the occupant insolation ratio map 60 is a map necessary for obtaining an occupant insolation level, and is obtained in the following way.

Figure 3:
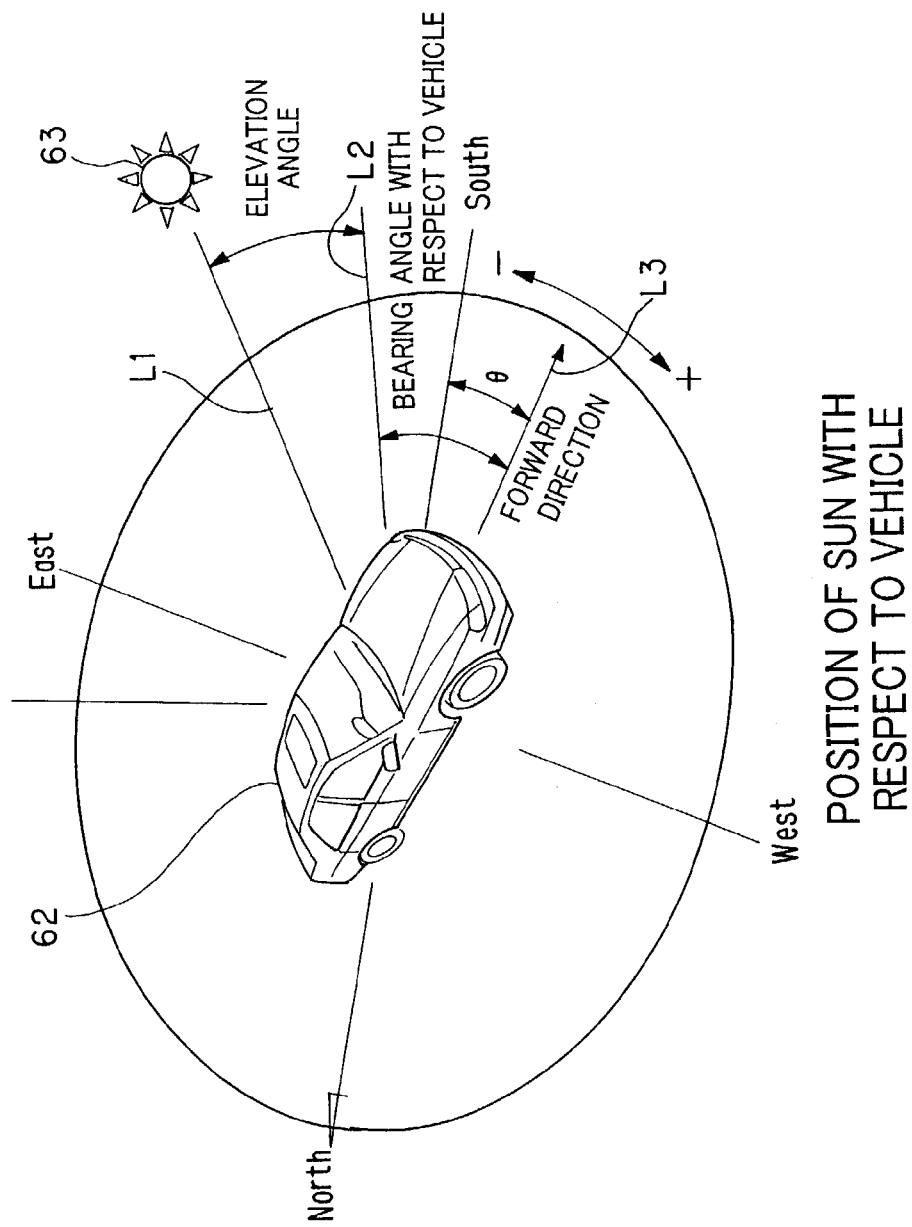
FIG. 3 is a view showing a direction of solar radiation (bearing angle, elevation angle) with respect to a vehicle body.

FIG. 3 is a view illustrating the direction of the sun with respect to the vehicle; that is, the solar radiation direction (a bearing angle and an elevation angle). The elevation angle is defined as the angle between the line L1 connecting the center of the vehicle body 62 with the center of the sun 63 and its projection L2 onto the road surface. The bearing angle is defined as the angle between the projection L2 onto the road surface of the line connecting the center of the vehicle body 62 with the center of the sun 63 and the forward direction L3 of the vehicle body 62.

Figure 4:
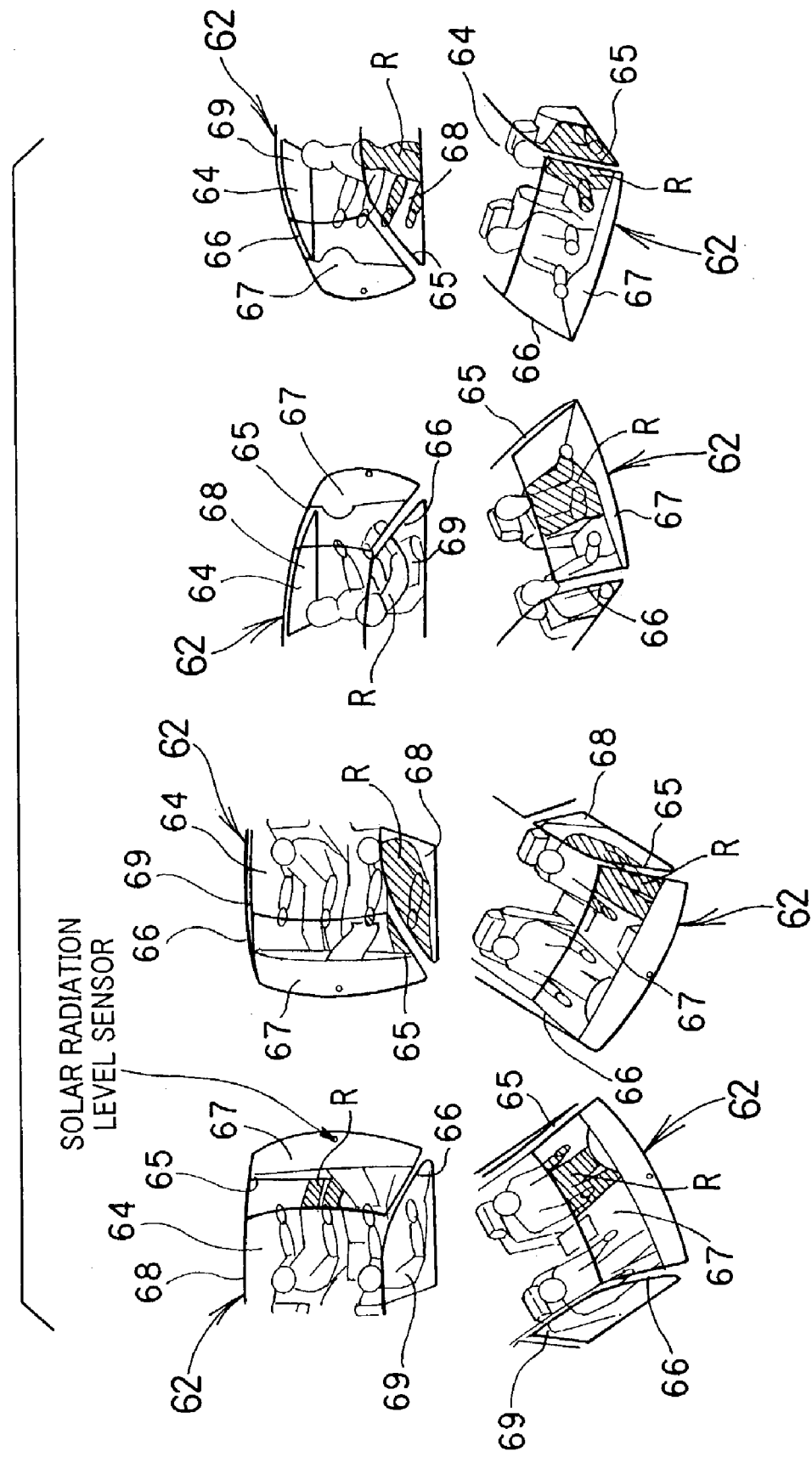
FIG. 4 is a view showing how a vehicle occupant is exposed to solar radiation for each of various solar radiation directions when occupants are seated in a passenger compartment.
Figure 5:
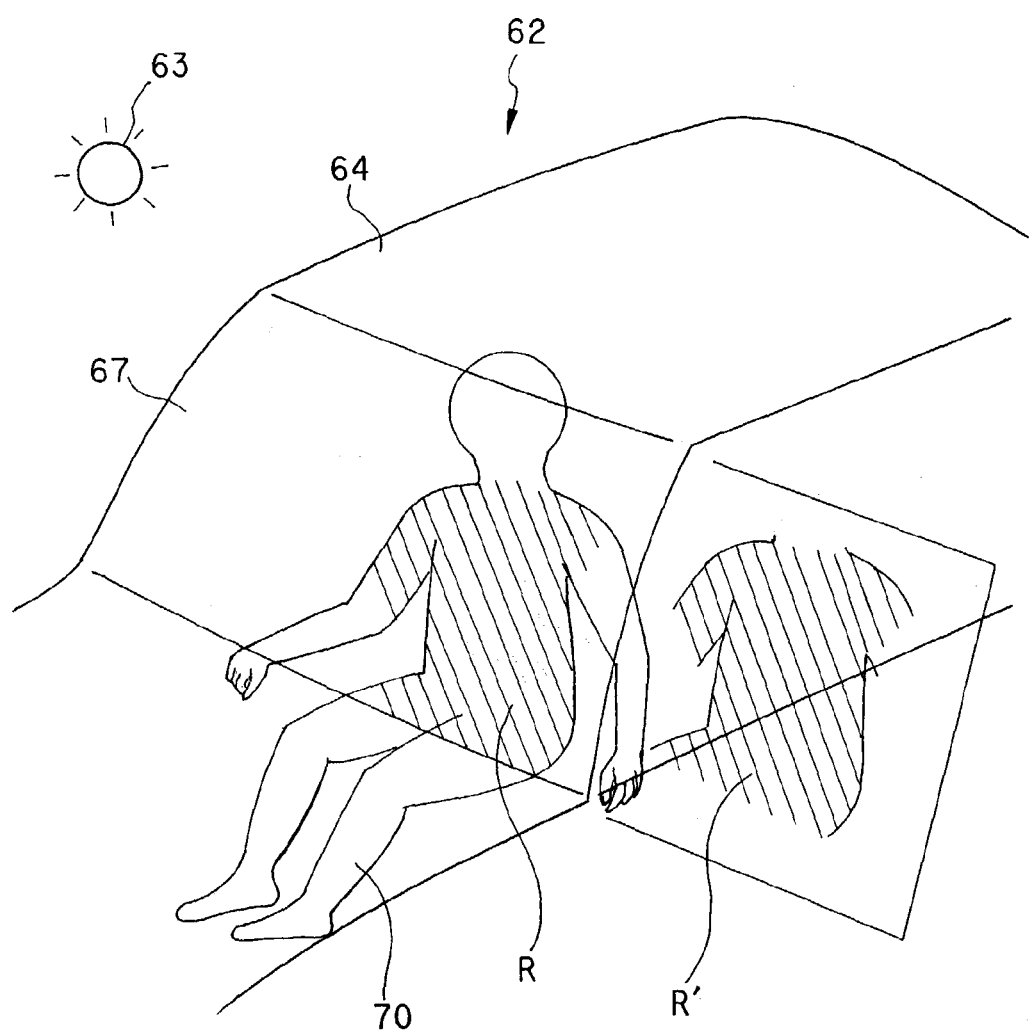
FIG. 5 is a view showing how a vehicle occupant seated in a passenger compartment is exposed to solar radiation from a certain solar radiation direction.

FIGS. 4 and 5 are views showing how the left seat occupant receives solar radiation for each of various solar radiation directions when occupants are seated in the passenger compartment. FIG. 4 shows that there are shaded parts where the sun's rays (solar radiation) are blocked by the roof 64 and the pillars 65, 66 of the vehicle 62 and parts R where solar radiation is incident on the occupant 70 through the transparent front windshield 67 and side windows 68, 69.

The incidence of solar radiation on the occupant varies with the solar radiation direction, as shown in FIG. 4, and for each of various solar radiation directions the projection area S of the projection R' when seen from the direction of the sun of the part R where the occupant receives solar radiation is calculated experimentally or by simulation. For example, when the positional relationship of the vehicle 62 and the sun 63 is as shown in FIG. 5, the area of the projection R' when seen from the direction of the sun of the part R of the occupant 70 which is exposed to solar radiation is the projection area S.

The projection area S takes various values depending on the solar radiation direction, and takes a maximum value at a certain solar radiation direction. The ratio of the projection area varying with the solar radiation direction to this maximum value thereof, when the maximum value is taken as 1, will be called the occupant insolation ratio. The characteristic of the occupant insolation ratio varying with the solar radiation direction obtained in this way is the occupant insolation ratio map. Alternatively, solar radiation level sensors may be attached to a body in multiple locations; the solar radiation levels of the solar radiation level sensors on parts receiving solar radiation totalled to obtain a total solar radiation level; and an occupant insolation ratio obtained from the ratio of the total solar radiation level varying with the solar radiation direction to the maximum value of this solar radiation level total as it varies with the position of the sun with respect to the vehicle, when this maximum value is taken as 1.

Figure 6:
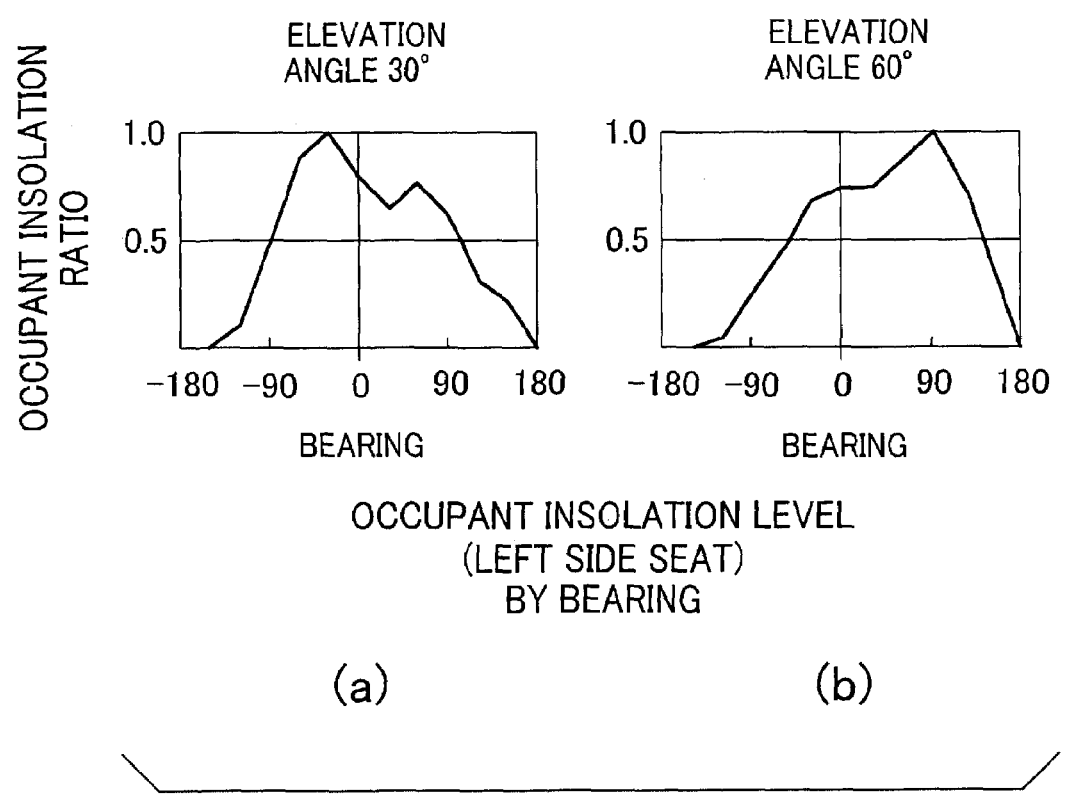
FIGS. 6A and 6B are views showing parts of an occupant insolation ratio map as graphs, FIG. 6A showing change of an occupant insolation ratio with bearing angle at an elevation of 30° for a left side seat and FIG. 6B showing change of the occupant insolation ratio with bearing angle at an elevation of 60° for the left side seat.

FIGS. 6A and 6B are views each showing a part of an occupant insolation ratio map as a graph. In FIG. 6A, as an example, change of the occupant insolation ratio with bearing angle at an elevation angle of 30° is shown for the left side seat, and in FIG. 6B change of the occupant insolation ratio with bearing angle at an elevation angle of 60° is shown for the left side seat.

Occupant insolation ratio vs. bearing angle relationships like those shown in these graphs are obtained experimentally or by simulation for the left side seat and various elevations angles and for the right side seat and various elevation angles, and stored in the memory 56 shown in FIG. 2 as an occupant insolation ratio map. An occupant insolation level can be obtained as the product of an occupant insolation ratio and a solar radiation level obtained from the solar radiation level sensor.

A motor driving circuit 54 shown in FIG. 2 produces signals which drive the left seat outlet switching door driving motor 24 and the right seat outlet switching door driving motor 29.

Figure 7:
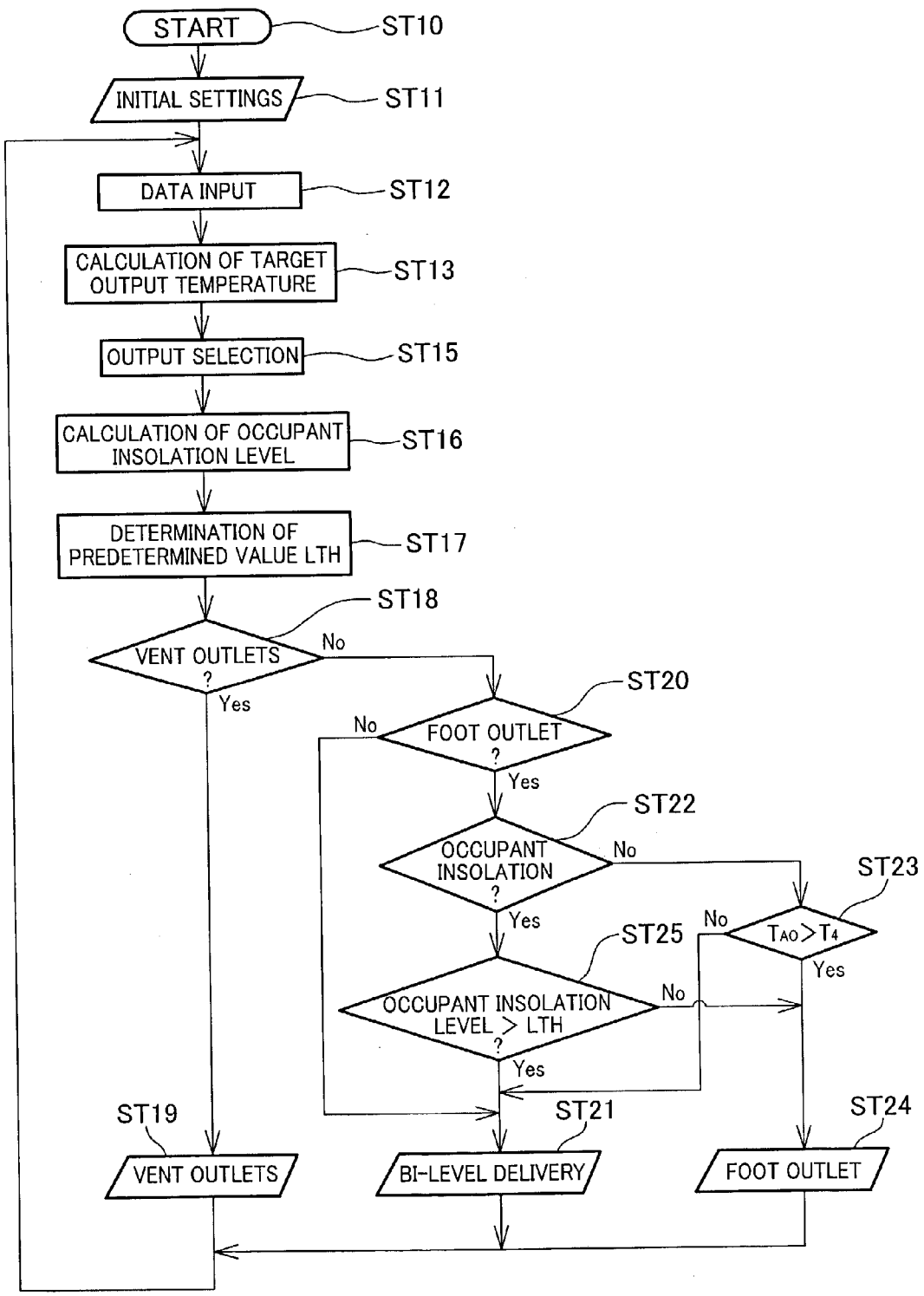
FIG. 7 is a flow chart showing processing executed by the mode switching control device shown in FIG. 2.

Next, the operation of a vehicle air-conditioning apparatus mode switching control device according to the invention will be described, on the basis of FIG. 1, FIG. 2 and the flow chart of FIG. 7.

First, when the ignition switch 46 shown in FIG. 1 is turned on, the computer 49 shown in FIG. 2 initializes. Then, it checks by way of an interface whether the air-conditioner ON switch on the switch panel 42 has been turned on.

The ON switch on the switch panel 42 is turned on. This starts processing by the computer 49 (step ST10). First, the internal state of the computer 49 and the operating state of the air-conditioning apparatus 1 are brought to initial states (step ST11).

Next, the computer 49 inputs signals from the inside air temperature sensor 31, the outside air temperature sensor 32, the temperature setter 33, the solar radiation level sensor 38 and the solar radiation direction detecting device 39, and inputs the state of an operating mode switch on the switch panel 42 (step ST12).

Then, target outlet temperatures TAO needed for achieving the set temperatures are calculated (step ST13). The target outlet temperatures TAO are calculated for example according to formula (1).

$$TAO = Ks \times Ts - Kr \times Tr - Ka \times Ta - Ksun \times Tsun + C \quad (1)$$

where Ks, Kr, Ka, Ksun, C are pre-set constant values.

Figure 8:
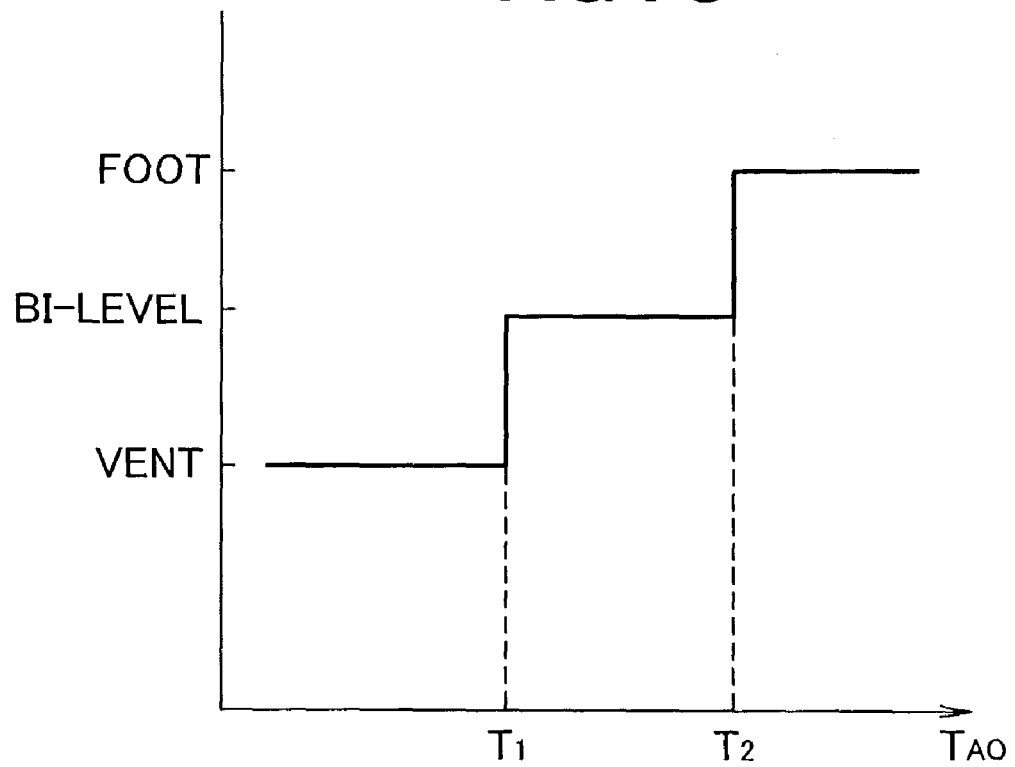
FIG. 8 is a determination graph for selecting a delivery mode on the basis of a target outlet temperature.

Next, in correspondence with each calculated target outlet temperature TAO, a delivery mode is selected (step ST15). As shown in FIG. 8, this selection is carried out by determining in which of three ranges separated by a temperature T1 and a temperature T2 the target outlet temperature TAO lies. On the basis of the respective target outlet temperature TAO obtained by calculation from the set temperature, the inside air temperature, the outside air temperature and the solar radiation level, an outlet is provisionally decided. When the outside air temperature is low and a high outlet temperature is needed and consequently, when the target outlet temperature TAO is above the temperature T2, the foot mode outlet is selected. When the target outlet temperature TAO is below the temperature T1, vent mode delivery is selected, and when the target outlet temperature TAO is between T1 and T2, bi-level mode delivery is selected.

In this way, respective outlets are selected and the positions of the outlet switching doors 23, 28 of the respective seats are determined by the outlet switching door driving motors 24, 29 driving the outlet switching doors 23, 28 in accordance with the respective target outlet temperatures TAO of the seats so that when the target outlet temperature TAO of a seat is a relatively low temperature air is blown through the vent outlets and when it is a high temperature air is blown through the foot outlet.

Next, the occupant insolation levels are obtained (step ST16). On the basis of a solar radiation direction obtained by the solar radiation direction detecting sensor 39 shown in FIG. 2, an occupant insolation ratio is obtained for the left side seat in accordance with the occupant insolation ratio map 60 stored in the memory 56. Then, the product of this occupant insolation ratio and the solar radiation level is calculated, and an occupant insolation level for the left side seat is thereby obtained. And, on the basis of the solar radiation direction, an occupant insolation ratio is obtained for the right side seat in accordance with the occupant insolation ratio map 60 stored in the memory 56. And then the product of this occupant insolation ratio and the solar radiation level is calculated and an occupant insolation level for the right side seat is obtained. In this way, an occupant insolation level for each seat is found by obtaining the product of an occupant insolation ratio obtained from the occupant insolation ratio map 60 on the basis of the elevation angle and bearing angle of the sun with respect to the vehicle received from the solar radiation direction detecting sensor 39 and the solar radiation level received from the solar radiation level sensor 38.

Processing after the occupant insolation levels are obtained is carried out in the following way. That is, even when from the target outlet temperature TAO the foot mode outlet has been selected in accordance with the determination graph shown in FIG. 8, when the occupant insolation level is above a predetermined value, bi-level mode delivery is effected. This predetermined value is varied in correspondence with the target outlet temperature.

By this means, even when a foot mode delivery has been selected, when solar radiation strikes a respective occupant directly, because the solar radiation heats the body of the occupant directly and the parts of the body receiving the solar radiation become hot, a draft is also blown from the vent outlets 21, 22, 26, 27 for delivering drafts at a low delivery temperature for cooling received heat.

In this case, since because the outside air temperature is low the cool draft delivery through the vent outlets 21, 22, 26, 27 causes the compartment temperature to fall and the parts not exposed to solar radiation to become cold, the outlet switching doors 23, 28 are brought to positions such that delivery is possible through both the vent outlets and the foot outlets (bi-level mode delivery), so that warm air is also delivered through the foot outlets 20, 25.

Figure 9:
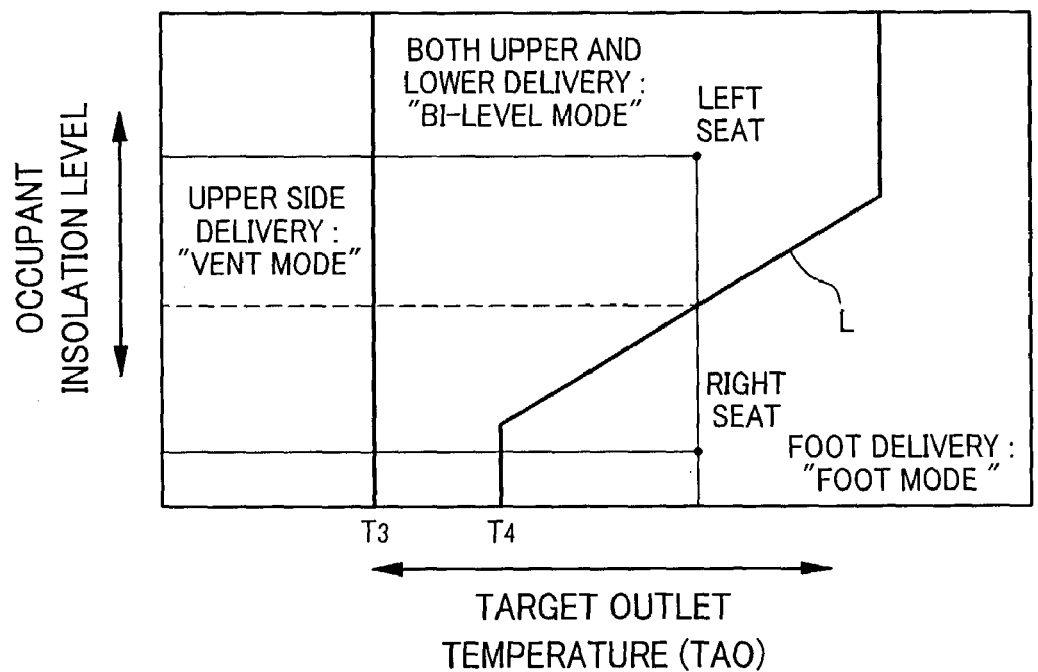
FIG. 9 is a characteristic chart serving as a reference for performing a determination for outlet selection.
Figure 10A:
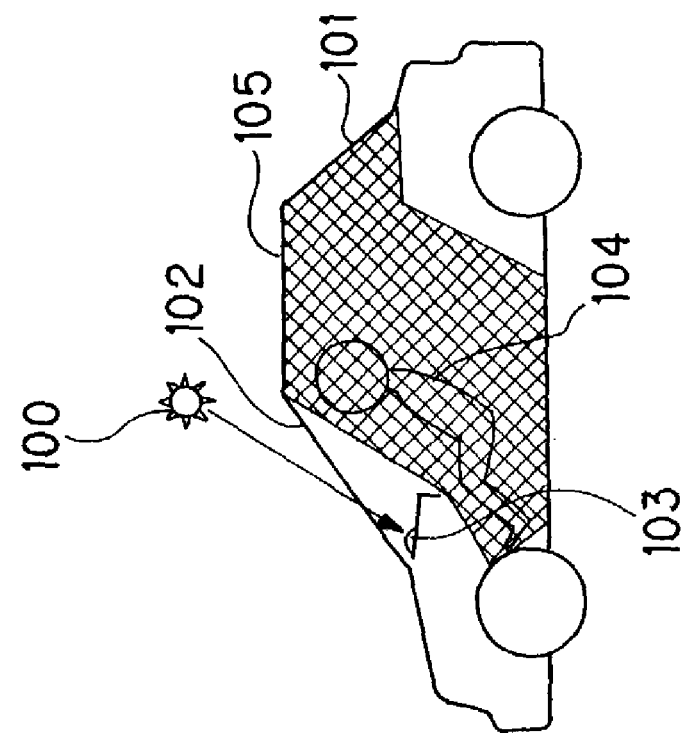
FIGS. 10A and 10B are views showing differences in the solar radiation received by an occupant and the solar radiation received by a solar radiation level sensor resulting from the positional relationship between the vehicle body and the sun, FIG. 10A showing the sun positioned in front of the vehicle and FIG. 10B showing the sun positioned above the vehicle.
Figure 10B:
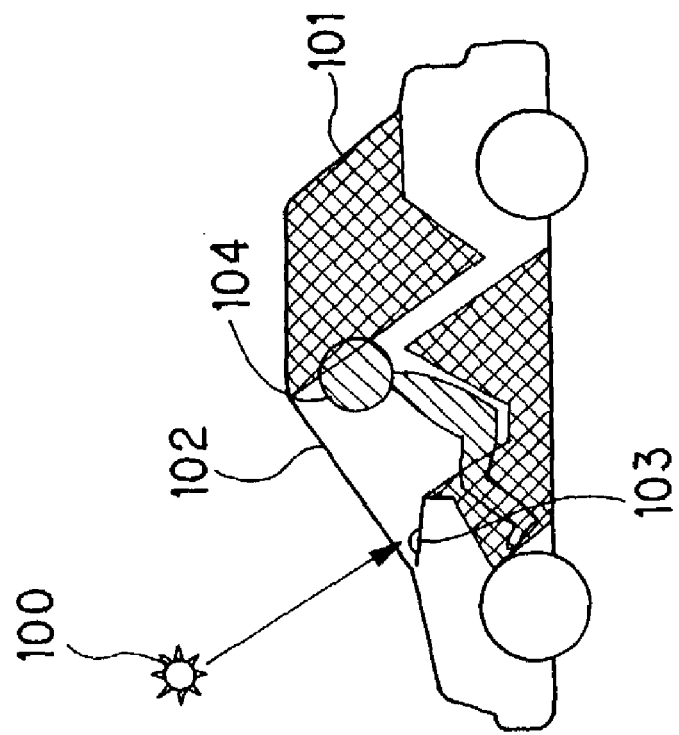

FIG. 9 is a characteristic chart to serve as a reference for carrying out a determination for outlet selection, the horizontal axis showing target outlet temperature and the vertical axis showing occupant insolation level. When the occupant insolation level is zero, if the target outlet temperature TAO is below a temperature T3, vent mode delivery is effected; if the target outlet temperature TAO is between the temperature T3 and a temperature T4, bi-level mode delivery is effected; and when the target outlet temperature TAO is above the temperature T4, foot mode delivery is effected.

When the occupant insolation level is not zero, if the target outlet temperature TAO is below the temperature T3, vent mode delivery is effected; when it is above a threshold value curve L, foot mode delivery is effected; and when it is above the temperature T3 and below the threshold value curve L, bi-level mode delivery is effected. The threshold value changes with the size of the occupant insolation level, and is higher the higher is the occupant insolation level. The corresponding occupant insolation level Lth on the threshold value curve L at a given target outlet temperature TAO is the above-mentioned predetermined value.

In accordance with the characteristic chart of FIG. 9, mode switching is carried out on the basis of the occupant insolation level. FIG. 9 shows a case wherein, in an air-conditioning apparatus with which left and right outlets can be switched independently, solar radiation is incident from the left seat side. In this case, as shown in the figure, because the projection area of the solar radiation incident on the body of the occupant of the left seat is large and the left seat occupant insolation level is high, the left seat is in the bi-level delivery selection zone. But for the right seat, although the solar radiation level obtained by the solar radiation level sensor is the same, the projection area of solar radiation incident on the occupant is smaller and the occupant insolation level is smaller, and consequently the right seat is in the foot mode delivery selection zone.

Thus, when there is no solar radiation on an occupant, outlet switching is carried out on the basis of the target outlet temperature, in accordance with a related art outlet switching method, a long the horizontal axis. And when the occupant insolation level is not zero, the switching point moves with the occupant insolation level obtained by the method described above, and when this occupant insolation level exceeds a predetermined level it enters the bi-level mode delivery zone. A signal to this effect moves the position of the outlet switching door 23, 28 with the respective outlet switching door driving motor 24, 29 to a position such that delivery is possible from both above and below.

Next, the processing carried out after the occupant insolation levels are obtained will be explained in detail, following the steps ST17 onward in the flow chart of FIG. 7. In the following, as an example the left seat side is discussed, but processing is carried out in the same way as that described below for the right seat side also.

First, from the characteristic chart shown in FIG. 9 the predetermined value Lth of the occupant insolation level is determined by reference to the threshold value curve L (step ST17). Next, it is determined whether or not the outlet selected in step ST15 is the vent outlets (step ST18). When it is the vent outlets, the left seat outlet switching door driving motor 24 is driven to close the left seat foot outlet 20 with the left seat outlet switching door 23. As a result, air is delivered through the left seat vent outlets 21, 22 (step ST19).

When in step ST18 the outlet is not the vent outlets, it is determined whether or not the left seat foot outlet 20 has been selected (step ST20). When foot delivery has not been selected, the left seat outlet switching door driving motor 24 is driven to bring the left seat outlet switching door 23 to an intermediate position. By this means, bi-level mode delivery is effected (step ST21).

When in step ST20 foot delivery has been selected, it is determined whether or not the occupant insolation level is zero (step ST22). When the occupant insolation level is zero, it is determined whether or not the target outlet temperature TAO is above the temperature T4 (step ST23). When the target outlet temperature TAO is lower than the temperature T4, bi-level mode delivery is effected (step ST21). When the target outlet temperature TAO is above the temperature T4, the left seat outlet switching door driving motor 24 is driven to close the left seat vent outlets 21, 22 and foot delivery is effected (step ST24).

When in step ST22 the occupant insolation level is not zero, it is determined whether or not the occupant insolation level is larger than the predetermined value Lth (step ST25). When the occupant insolation level is smaller than the predetermined value Lth, foot delivery is effected (step ST24). When the occupant insolation level is larger than the predetermined value Lth, bi-level delivery is effected (step ST21).

By this means, mode switching matched to the occupant's feeling of solar radiation can be achieved. And, occupant insolation levels can be obtained accurately while utilizing a solar radiation level sensor provided in the air-conditioning apparatus. And optimal mode switching corresponding to the size of the target outlet temperature is possible.

The steps described above are executed repeatedly with a normally amply fast cycle set by the operating clock frequency of the computer.

In this way, even when from the target outlet temperature foot mode delivery has been selected, when the occupant insolation level is above a predetermined value, bi-level mode delivery is invoked, and mode switching matched to the occupant's feeling of solar radiation can be achieved.

In this preferred embodiment, a case wherein independent left and right outlet switching means are provided has been described. When independent left and right outlet switching means are not provided, an occupant insolation ratio map may be provided for use with the driver's seat only. In this case, a driver's seat occupant insolation level is obtained from a solar radiation direction detecting device for obtaining the solar radiation direction, that is, the elevation angle and bearing angle of the sun with respect to the vehicle; the solar radiation level sensor; and the occupant insolation ratio map. When from the target outlet temperature the foot mode is selected, if the driver's seat occupant insolation level exceeds a predetermined level, the bi-level mode is selected for both the left seat and the right seat. A signal to this effect moves the position of an outlet switching door with a motor to a position such that delivery is possible from both above and below.

And, when independent left and right outlet switching means are not provided, an occupant insolation ratio map may alternatively be obtained from average values of projection areas of the left and right seats. In this case, an average occupant insolation level is obtained from a solar radiation direction detecting device for obtaining the solar radiation direction, that is, the elevation angle and bearing angle of the sun with respect to the vehicle; a solar radiation level sensor; and the occupant insolation ratio map. When from the target outlet temperature the foot mode is selected, if the average occupant insolation level exceeds a predetermined level, the bi-level mode is selected for both the left seat and the right seat. A signal to this effect moves the position of an outlet switching door with a motor to a position such that delivery is possible from both above and below.

Also, when independent left and right outlet switching means are not provided, alternatively both an occupant insolation ratio map obtained from average values of projection areas of the left and right seats and an occupant insolation ratio map obtained from projection areas of the driver's seat only may be provided. In this case, when only the driver's seat is occupied outlet switching is carried out from an occupant insolation level of the driver's seat only, and when both the driver's seat and the passenger seat are occupied outlet switching is carried out from an average occupant insolation level.

Differences arise in the strength of the solar radiation reaching different parts of an occupant through window glass, depending on the angle of transmission and the transmissivity of the solar radiation through the window glass. To deal with this, in a device in which an occupant insolation ratio is obtained in correspondence with the position of the sun with respect to the vehicle from the projection area as seen in the solar radiation direction of the parts of the body of an occupant exposed to solar radiation, the projection area may be divided into multiple parts and a respective ratio of solar radiation strength with respect to a maximum value taken as 1 obtained for each part from a respective transmission angle and transmissivity of the solar radiation with respect to the window glass and a sum of corrected areas obtained by multiplying these by the respective divisional areas may be taken as the projection area. When this is done, an occupant insolation ratio can be obtained still more precisely.

As will be clear from the foregoing explanation, with this invention, even when from a target outlet temperature a foot mode has been selected, when an occupant insolation level is above a predetermined value, a bi-level mode is invoked, and consequently mode switching matched to an occupant's feeling of solar radiation can be achieved. And, because the occupant insolation level is obtained by multiplying a solar radiation level obtained from a solar radiation level sensor by an occupant insolation ratio obtained from a projection area as seen in a solar radiation direction of a part of the body of an occupant receiving solar radiation in correspondence with the position of the sun with respect to the vehicle, or by an occupant insolation ratio obtained from a solar radiation level of a part of the body of an occupant receiving solar radiation in correspondence with the position of the sun with respect to the vehicle, a solar radiation level received from the sun by an occupant can be obtained accurately while utilizing a solar radiation level sensor provided in the air-conditioning apparatus. Also, because the predetermined value is changed in correspondence with the target outlet temperature, optimal mode switching corresponding to the size of the target outlet temperature can be carried out.

The present disclosure relates to the subject matter of Japanese Patent Application No. 2002-165637, filed Jun. 6, 2002, the disclosure of which is expressly incorporated herein by reference in its entirety.

What is claimed is:

1. A mode switching control device of a vehicle air-conditioning apparatus, the control device being capable of selecting:

vent mode delivery, whereby air is delivered to an upper part of the inside of a passenger compartment, foot mode delivery, whereby air is delivered to a lower part of the inside of the passenger compartment, and bi-level mode delivery, whereby the vent mode delivery and the foot mode delivery are implemented together, wherein the control device performs control to effect the bi-level mode delivery whenever an occupant insolation level representing an estimated amount of heat being received by the body of an occupant in the form of radiation from the sun is above a predetermined threshold value even when on the basis of a target outlet temperature the foot mode delivery has been selected, wherein the predetermined threshold value increases as the target outlet temperature increases.

2. A mode switching control device according to claim 1, wherein the occupant insolation level is obtained by multiplying a solar radiation level obtained from a solar radiation level sensor by an occupant insolation ratio obtained from a projection area as seen in a solar radiation direction of a part of the body of an occupant receiving solar radiation in correspondence with the position of the sun with respect to the vehicle.

3. A mode switching control device according to claim 1, wherein the occupant insolation level is obtained by multiplying a solar radiation level obtained from a solar radiation level sensor by an occupant insolation ratio obtained from a solar radiation level of a part of the body of an occupant receiving solar radiation in correspondence with the position of the sun with respect to the vehicle.

* * * * *